(12) United States Patent
Honda et al.

(10) Patent No.: US 7,928,628 B2
(45) Date of Patent: Apr. 19, 2011

(54) ELECTRIC MOTOR HAVING TERMINAL CONNECTABLE WITH EXTERNAL CONNECTOR

(75) Inventors: Tetsuya Honda, Toyohashi (JP); Nobuyuki Takahashi, Susono (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 12/153,033

(22) Filed: May 13, 2008

(65) Prior Publication Data
US 2008/0284272 A1    Nov. 20, 2008

(30) Foreign Application Priority Data

May 14, 2007    (JP) ................................ 2007-128071

(51) Int. Cl.
*H02K 11/00*    (2006.01)
*H02K 13/00*    (2006.01)
(52) U.S. Cl. ........... 310/239; 310/71; 310/219; 310/238
(58) Field of Classification Search .................. 310/238, 310/239, 219, 71; 314/130, 133; *H01R 39/38, H01R 39/00, 39/39; H02K 13/00, 5/14, 5/22, H02K 5/10, 7/116, 5/04, 23/00, 11/00; F16B 5/10, F16B 5/00*
See application file for complete search history.

(56) References Cited

U.S. PATENT DOCUMENTS

| 3,482,135 | A | * | 12/1969 | Hurlin | 310/239 |
| 4,746,829 | A | * | 5/1988 | Strobl | 310/239 |
| 5,013,952 | A | * | 5/1991 | Sekine et al. | 310/239 |
| 5,521,457 | A | * | 5/1996 | Kawasaki et al. | 310/352 |
| 5,886,448 | A | * | 3/1999 | Yoshida | 310/249 |
| 6,186,837 | B1 | * | 2/2001 | Abe | 439/748 |
| 6,339,272 | B1 | * | 1/2002 | Sato | 310/87 |
| 6,445,097 | B1 | * | 9/2002 | Zeiler et al. | 310/71 |
| 6,701,604 | B2 | * | 3/2004 | Zeiler et al. | 310/71 |
| 2001/0013728 | A1 | * | 8/2001 | Harita et al. | 310/71 |

FOREIGN PATENT DOCUMENTS

JP    09242719 A  *  9/1997
JP    A-H9-242719      9/1997
JP    A-2003-111349    4/2003

OTHER PUBLICATIONS

Machine Translation of Nishio et al. (JP09-242719).*

* cited by examiner

*Primary Examiner* — Quyen Leung
*Assistant Examiner* — Michael Andrews
(74) *Attorney, Agent, or Firm* — Posz Law Group, PLC

(57) ABSTRACT

In a terminal of an electric motor, a branch projects from a terminal connection on a side opposite from an extension. A projecting end side of the branch extends in an installation direction of the terminal, which is a direction for installing the terminal to a housing. The terminal is tiltable about a portion of the extension, which serves as a fulcrum, to cause abutment of the branch against a wall surface of the housing when the terminal connection receives a force in a direction opposite from the installation direction.

14 Claims, 6 Drawing Sheets

ELECTRIC MOTOR HAVING TERMINAL CONNECTABLE WITH EXTERNAL CONNECTOR

CROSS REFERENCE TO RELATED APPLICATION

This application is based on and incorporates herein by reference Japanese Patent Application No. 2007-128071 filed on May 14, 2007.

BACKGROUND OF THE INVENTION

1. Field of the Invention

The present invention relates to an electric motor.

2. Description of Related Art

In general, in a case of an electric motor, which includes a rotatable shaft and an armature, a brush holder is fitted to an opening of a yoke housing of the motor to provide electric power for rotating the armature, and terminals are installed in the brush holder. One end of each terminal is connected to a corresponding brush, which is supported by the brush holder, and the other end of the terminal is connected to a terminal of an external connector, which is connected to an external power source. The electric power, which is received from the external power source, is supplied to the brushes to rotate the armature.

In the prior art structure, in order to reduce a size of the motor in the axial direction to implement a low profile motor, the terminals protrude from the lateral side of the brush holder to connect with the terminals of the external connector (see, for example, Japanese Unexamined Patent Publication No. 2003-111349).

The motor recited in Japanese Unexamined Patent Publication No. 2003-111349 includes an armature, a yoke housing and a brush holder. A rotatable shaft and a commutator are provided in the armature. The yoke housing is cup-shaped and rotatably receives the armature. The brush holder closes an opening end of the yoke housing and holds brushes, which slidably engage the commutator.

As shown in FIG. 6A, the brush holder 101 includes a holder main body 102, a connector portion 103 and an interconnecting portion 104. The holder main body 102 is fitted in the yoke housing and holds the brushes. The connector portion 103 is disposed radially outward of the holder main body 102 and is connected with terminals of an external connector 110. The interconnecting portion 104 connects between the holder main body 102 and the connector portion 103. The terminals 105 are inserted such that the terminals 105 extend over the holder main body 102, the connector portion 103 and the interconnecting portion 104. One end (a brush contact) of each terminal 105 is connected to the corresponding brush, and the other end (a terminal connection 105a) of the terminal 105 is disposed in an opening 103a of the connector portion 103.

The external connector 110 is inserted in the opening 103a of the connector portion 103, so that the terminals of the external connector 110 are connected with the other ends of the terminals 105 (the terminal connections 105a). As described above, the terminals 105 protrude radially outward from the brush holder 101, so that it is not required to axially expand the brush holder 101. Thereby, it is possible to reduce a size of the brush holder 101 in the axial direction.

As shown in FIG. 6B, fitting grooves 101a extend along the holder main body 102, the connector portion 103 and the interconnecting portion 104. The terminals 105 are fitted into the fitting grooves 101a, respectively, and thereby installed in the brush holder 101.

In the motor having the above structure, an installation direction (a direction of an arrow X in FIG. 6B) of the terminals 105 for installing the terminals 105 into the brush holder 101 is the same as a connecting direction of the terminals 105 for connecting the terminals 105 to the terminals of the external connector 110. Furthermore, a power supply line extends from the terminal 105 to the brush. Thus, when the external connector 110 is pulled away from the terminal connections 105a, the terminal connection 105a side of the terminals 105 are pulled in a pulling direction of the external connector 110 (a direction opposite from the installation direction), and thereby the terminals 105 are sometimes unintentionally removed from the fitting grooves 101a of the brush holder 101.

According to another technique, a portion of a terminal is cut and is bent to form a resilient engaging piece in the terminal, and a corresponding engaging hole is formed in a connector housing and is engaged with the resilient engaging piece to limit unintentional removal of the terminal from the connector housing (see, for example, Japanese Unexamined Patent Publication No. 11-3739). With this structure, even when a force acts on the terminal in the pulling direction, the resilient engaging portion of the terminal is effectively engaged with a wall of the engaging hole to resist against the pulling of the terminal, so that the unintentional removal of the terminal from the connector housing is limited, and thereby the terminal can be reliably held.

However, when the removal limiting structure of Japanese Unexamined Patent Publication No. 11-3739 is applied to the motor of Japanese Unexamined Patent Publication No. 2003-111349, in which the terminals radially outwardly protrude, the following disadvantage may be encountered.

That is, in the motor of Japanese Unexamined Patent Publication No. 2003-111349, an extension of the terminal, which connects between the terminal connection and the brush contact of the terminal, is fitted into the fitting hole of the housing. Thus, when the terminal connection of the terminal is pulled in the pulling direction, the terminal is tilted about a portion (fulcrum) of the extension. When the terminal is kept tilted further, the terminal is finally removed from the fitting groove of the brush holder.

Therefore, even in the case where the removal limiting structure of Japanese Unexamined Patent Publication No. 11-3739 is applied to the motor of Japanese Unexamined Patent Publication No. 2003-111349, when the external connector is pulled away from the terminals, the terminals are tilted, so that the engagement between the resilient engaging portion of each terminal and the housing may possibly be released by the tilting of the terminal, resulting in the removal of the terminal from the housing.

Furthermore, a width of the terminal of Japanese Unexamined Patent Publication No. 2003-111349 is relatively small. Therefore, it is difficult to form the resilient engaging portion by the cutting and pulling of the corresponding portion in the plate thickness direction in the terminal. Furthermore, the engaging hole needs to be formed in the housing (the brush holder in Japanese Unexamined Patent Publication No. 2003-111349), so that it is difficult to form the housing.

SUMMARY OF THE INVENTION

The present invention addresses the above disadvantages. Thus, it is an objective of the present invention to provide an electric motor, which limits removal of terminals from a housing through use of a relatively simple structure.

To achieve the objective of the present invention, there is provided an electric motor, which includes a motor main body, a housing and at least one terminal. The motor main body receives an armature in a rotatable manner. The housing is installed to the motor main body. The at least one terminal is installed in the housing and supplies electric power, which is received from an external connector, to the armature. Each of the at least one terminal includes a terminal connection, an extension, a brush contact and a branch. The terminal connection is connectable with a corresponding terminal of the external connector. The extension extends from and is bent relative to the terminal connection. The brush contact extends from the extension on a side opposite from the terminal connection and is electrically connected with the armature through a corresponding brush. The branch projects from the terminal connection on a side opposite from the extension. A projecting end side of the branch extends in an installation direction of the terminal, which is a direction for installing the terminal to the housing. The terminal is tiltable about a portion of the extension, which serves as a fulcrum, to cause abutment of the branch against a wall surface of the housing when the terminal connection receives a force in a direction opposite from the installation direction.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An electric motor according to an embodiment of the present invention will be described with reference to the accompanying drawings. The motor of the present embodiment is applicable as a motor of a power seat of a vehicle, which is capable of adjusting a seat position (e.g., a fore and aft position and a vertical position of the seat) and a tilt angle of a seat back of the seat.

Figure 1:
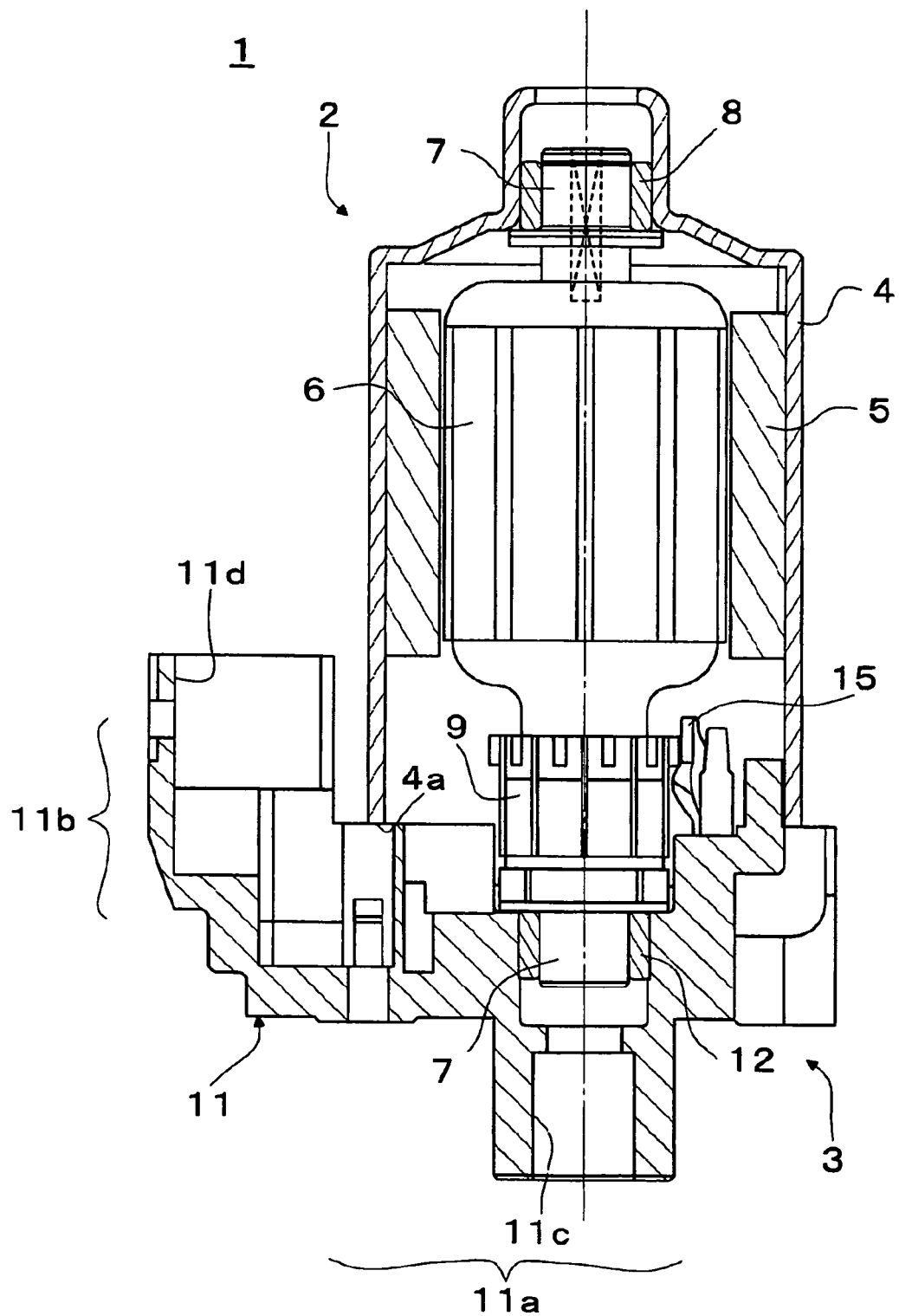
FIG. 1 is a partial cross sectional view showing an entire structure of a motor main body of a motor according to an embodiment of the present invention.

As shown in FIG. 1, the motor 1 includes a motor main body 2 and a brush holder 3.

The motor main body 2 includes a cup shaped yoke housing 4, which has an opening 4a. A plurality of magnets 5 is fixed to an inner peripheral surface of the yoke housing 4. An armature 6 is rotatably received in the yoke housing 4 at a location radially inward of the magnets 5. A rotatable shaft 7 is provided in the armature to extend in a longitudinal direction. A bottom center portion (a top center portion in FIG. 1) of the yoke housing 4 axially outwardly protrudes, and a bearing 8 is provided in this protruded portion of the yoke housing 4. One end side of the rotatable shaft 7 is rotatably supported by the bearing 8. A commutator 9 is fixed to the other end side of the rotatable shaft 7.

The brush holder 3 is fitted into the opening 4a of the yoke housing 4. The brush holder 3 includes the end housing 11, which is made of resin and covers the opening 4a of the yoke housing 4. The end housing 11 includes a housing main body 11a and a connector portion 11b. The housing main body 11a is fitted to the opening 4a of the yoke housing 4, and the connector portion 11b radially outwardly extends from an outer peripheral surface of the housing main body 11a.

Figure 2:
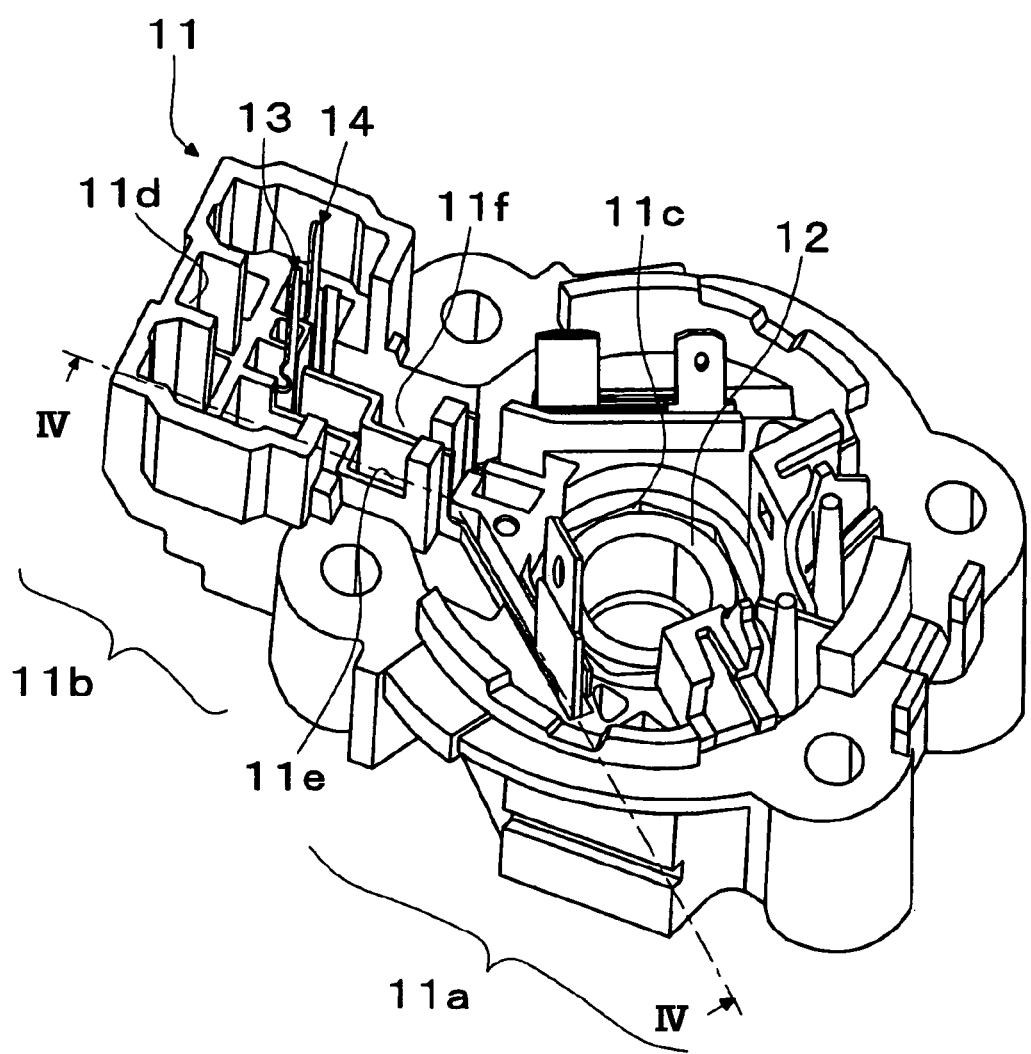
FIG. 2 is a perspective view showing an end housing and terminals of the motor main body shown in FIG. 1.
Figure 3:
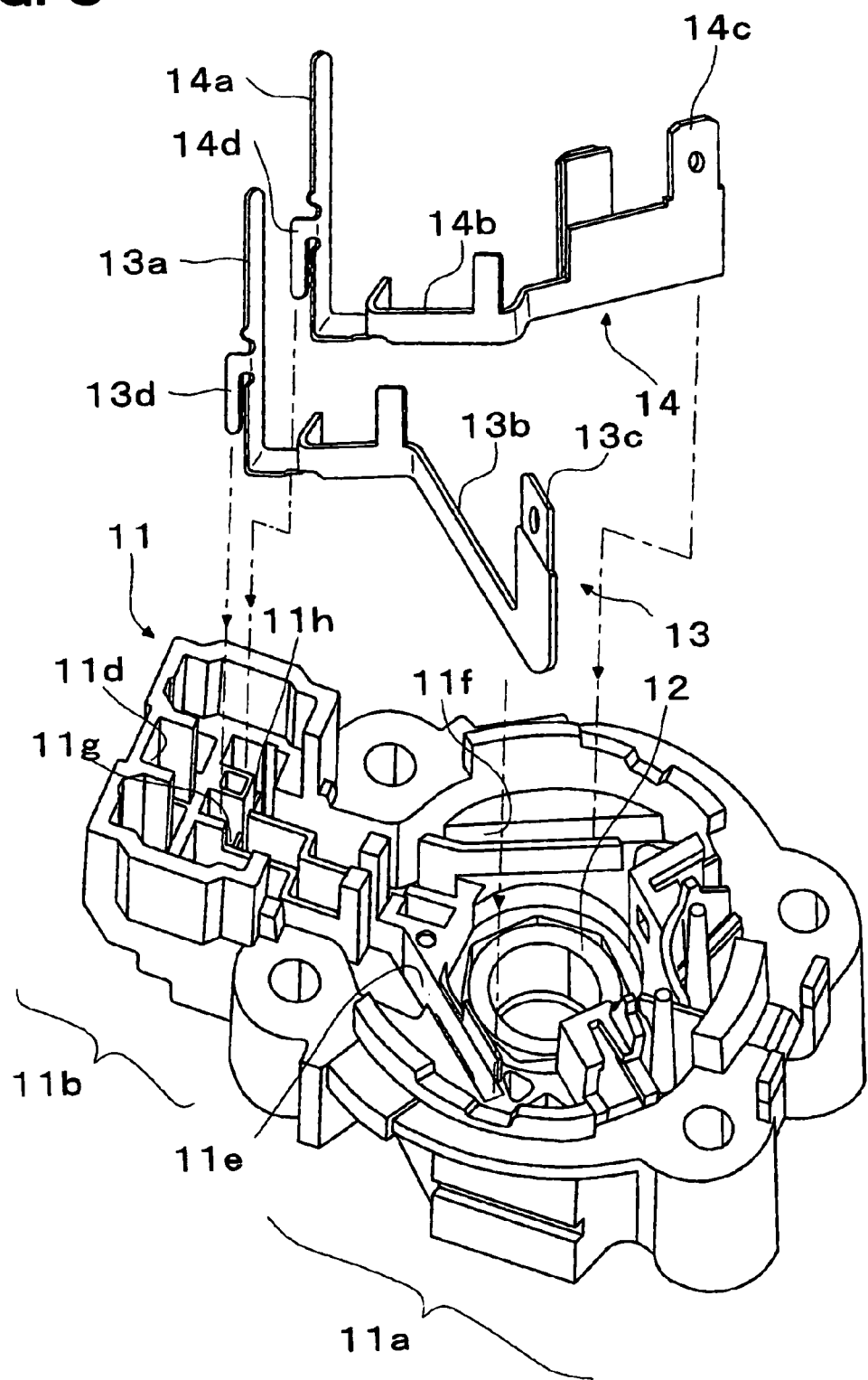
FIG. 3 is an exploded perspective view showing the end housing and the terminals of FIG. 2.

As shown in FIGS. 2 and 3, the housing main body 11a has a generally cylindrical shape as viewed from the axial side thereof and is connected to the other end side (an output end side) of the rotatable shaft 7 in the motor main body 2. An opening 11c extends through a center portion of the housing main body 11a in a direction parallel to the rotatable shaft 7 and receives a bearing 12. The output end side of the rotatable shaft 7 is rotatably supported by the bearing 12.

The connector portion 11b has a generally U-shaped cross section. A base end side (a lower end side in FIGS. 2 and 3) of the connector portion 11b is joined to the outer peripheral surface of the housing main body 11a in a direction perpendicular to the outer peripheral surface of the housing main body 11a, thereby integrated together with the housing main body 11a. Furthermore, a projecting end side (a top end side in FIGS. 2 and 3) of the connector portion 11b projects toward the motor main body 2 in a direction generally parallel to the rotatable shaft 7 (see FIG. 1). A projecting end surface (a top end surface in FIGS. 2 and 3) of the connector portion 11b and a portion (a right side portion in FIGS. 2 and 3) of an outer peripheral surface of the connector portion 11b located on a housing main body 11a side thereof are opened. A connection hole 11d is formed in the interior of the connector portion 11b to connect with the external connector 21 described later.

Two receiving grooves 11e, 11f are formed in the housing main body 11a and the connector portion 11b such that each of the receiving grooves 11e, 11f extends from a corresponding location, which is adjacent to the opening 11c of the housing main body 11a, to the base end portion of the connector portion 11b. More specifically, in a plane generally perpendicular to the rotatable shaft 7, the receiving grooves 11e, 11f extend generally parallel to each other in the connector portion 11b and then diverge from one another at a location around a boundary between the connector portion 11b and the housing main body 11a such that a distance between the receiving grooves 11e, 11f progressively increases toward the opening 11c. That is, when the receiving grooves 11e, 11f are viewed from the motor main body 2 side, the receiving grooves 11e, 11f form a Y-shape.

As shown in FIG. 3, a connector portion 11b side end portion of the receiving groove 11e has an accommodation hole 11g, which has a generally rectangular shape in a depth direction of the receiving hole 11e. Similarly, a connector portion 11b side end portion of the receiving groove 11f has an accommodation hole 11h, which has a generally rectangular shape in a depth direction of the receiving groove 11f.

Terminals 13, 14 are received in the receiving grooves 11e, 11f, respectively. The terminals 13, 14 are made of an electrically conductive material and serve as power supply members, which supply electric power to the armature 6 through brushes 15 (see FIG. 1). The terminals 13, 14 are connected to the external connector 21 described below to receive the electric power from an external power source (not shown).

The brushes 15 are connected to the terminals 13, 14, respectively. The brushes 15 slidably engage the commutator 9. FIG. 1 shows only one of the brushes 15, which are connected to the terminals 13, 14. In FIGS. 2 and 3, the brushes 15 are not shown for the sake of simplicity.

Figure 4:
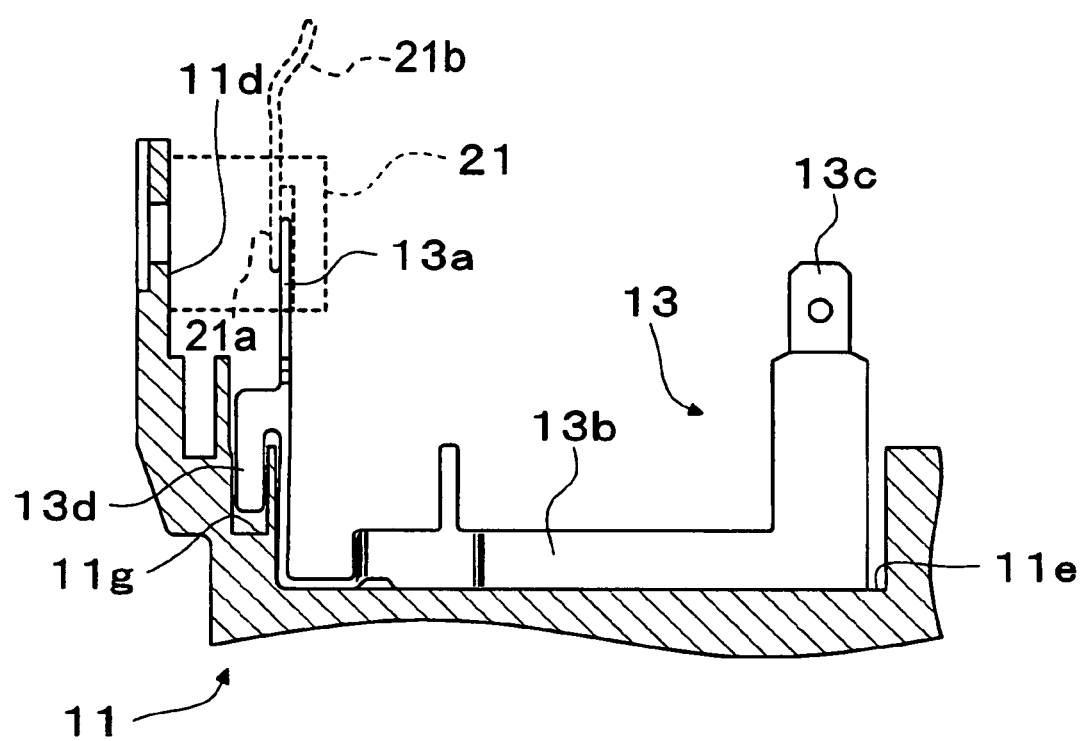
FIG. 4 is a partial cross sectional view showing an installed state of the terminal, which is installed in the end housing.

As shown in FIG. 3, the terminal 13 includes a terminal connection 13a, an extension 13b, a brush contact 13c and a branch 13d. As shown in FIG. 4, the terminal connection 13a contacts a corresponding terminal 21a of the external connector 21, which is connected to the power source through an electrically conductive line 21b, to receive the electric power from the power source (not shown). The extension 13b extends from one end of the terminal connection 13a and is bent to extend generally in the perpendicular direction, which is perpendicular to the terminal connection 13a. The brush contact 13c extends from an end of the extension 13b, which is opposite from the terminal connection 13a, in a direction that is generally parallel to the terminal connection 13a. The branch 13d projects from a center portion of the terminal connection 13a on a side opposite from the extension 13b such that a projecting end side of the branch 13d extends in a direction generally parallel to the terminal connection 13a, i.e., in an installation direction of the terminal 13 for installing the terminal 13 to the end housing 11.

The terminal 13 of the present embodiment is formed by stamping a corresponding part from a piece of a metal plate and bending it into a predetermined shape. A lateral surface of the terminal 13 is formed by a stamped cross section.

The terminal connection 13a is received into the connector portion 11b to directly contacts the terminal 21a of the external connector 21. The extension 13b is configured to extend along the receiving groove 11e. The extension 13b is received in and is fixed in the receiving groove 11e. The brush contact 13c includes a hole, to which an electrically conductive line of the brush 15 is connected, so that the brush contact 13c is connected to the brush 15. The branch 13d has a function of limiting unintentional removal of the terminal 13 from the receiving groove 11e by limiting tilting of the terminal 13. The branch 13d is configured into a generally L-shape as viewed from a lateral side thereof.

When the terminal 13 is received in the receiving groove 11e, the terminal connection 13a is exposed in the connection hole 11d and projects in a direction generally parallel to the rotatable shaft 7. Furthermore, the brush contact 13c projects in a direction generally parallel to the rotatable shaft 7 at a location around the opening 11c. When the motor main body 2 and the brush holder 3 are connected to each other, a projecting end side of the brush contact 13c is placed around the commutator 9. Thus, the brush 15, which is connected to the brush contact 13c, engages the commutator 9, so that the terminal 13 is electrically connected to the armature 6 through the brush 15 and the commutator 9.

The branch 13d is received in the accommodation hole 11g, which is formed in the end housing 11. The branch 13d is configured into the generally L-shape as viewed from the lateral side thereof, and the projecting end side of the branch 13d is oriented toward the end housing 11 side. Thereby, the projecting end side of the branch 13d is vertically fitted into the accommodation hole 11g.

Next, the terminal 14 will be described. The terminal 14 has generally the same structure as that of the terminal 13.

As shown in FIG. 3, the terminal 14 includes a terminal connection 14a, an extension 14b, a brush contact 14c and a branch 14d. The terminal connection 14a contacts the corresponding terminal 21a of the external connector 21 to receive the electric power from the power source (not shown). The extension 14b extends from one end of the terminal connection 14a and is bent to extend generally in the perpendicular direction, which is perpendicular to the terminal connection 14a. The brush contact 14c extends from an end of the extension 14b, which is opposite from the terminal connection 14a, in a direction that is generally parallel to the terminal connection 14a. The branch 14d projects from a center portion of the terminal connection 14a on a side opposite from the extension 14b such that a projecting end side of the branch 14d extends in a direction generally parallel to the terminal connection 14a, i.e., in an installation direction of the terminal 14 for installing the terminal 14 to the end housing 11.

Similar to the terminal 13, the terminal 14 of the present embodiment is formed by stamping a corresponding part from a piece of a metal plate and bending it into a predetermined shape. The functions of the terminal connection 14a, the extension 14b, the brush contact 14c and the branch 14d are similar to those of the terminal connection 13a, the extension 13b, the brush contact 13c and the branch 13d and thereby will not be described further for the sake of simplicity.

When the terminal 14 is received in the receiving groove 11f, the terminal connection 14a is exposed in the connection hole 11d and projects in a direction generally parallel to the rotatable shaft 7. Furthermore, the brush contact 14c projects in a direction generally parallel to the rotatable shaft 7 at a location around the opening 11c. Thus, the brush 15, which is connected to the brush contact 14c, engages the commutator 9, so that the terminal 14 is electrically connected to the armature 6 through the brush 15 and the commutator 9.

The branch 14d is received in the hole 11h, which is formed in the end housing 11. The projecting end side of the branch 14d is oriented toward the end housing 11 side. Thereby, the branch 14d is vertically fitted into the hole 11h. Upon the installation of the terminals 13, 14, the terminal connection 13a of the terminal 13 and the terminal connection 14a of the terminal 14 are aligned one after another in an imaginary plane, which extends in a direction perpendicular to the plane of FIG. 4. The branch 13d of the terminal 13 and the branch 14d of the terminal 14 are located on a side of the imaginary plane, which is opposite from the brush contact 13c of the terminal 13 and the brush contact 14c of the second terminal 14.

Next, a principle of limiting the unintentional removal of the terminal 13 with use of the branch 13d will be described with reference to FIGS. 4 and 5.

Figure 5A:
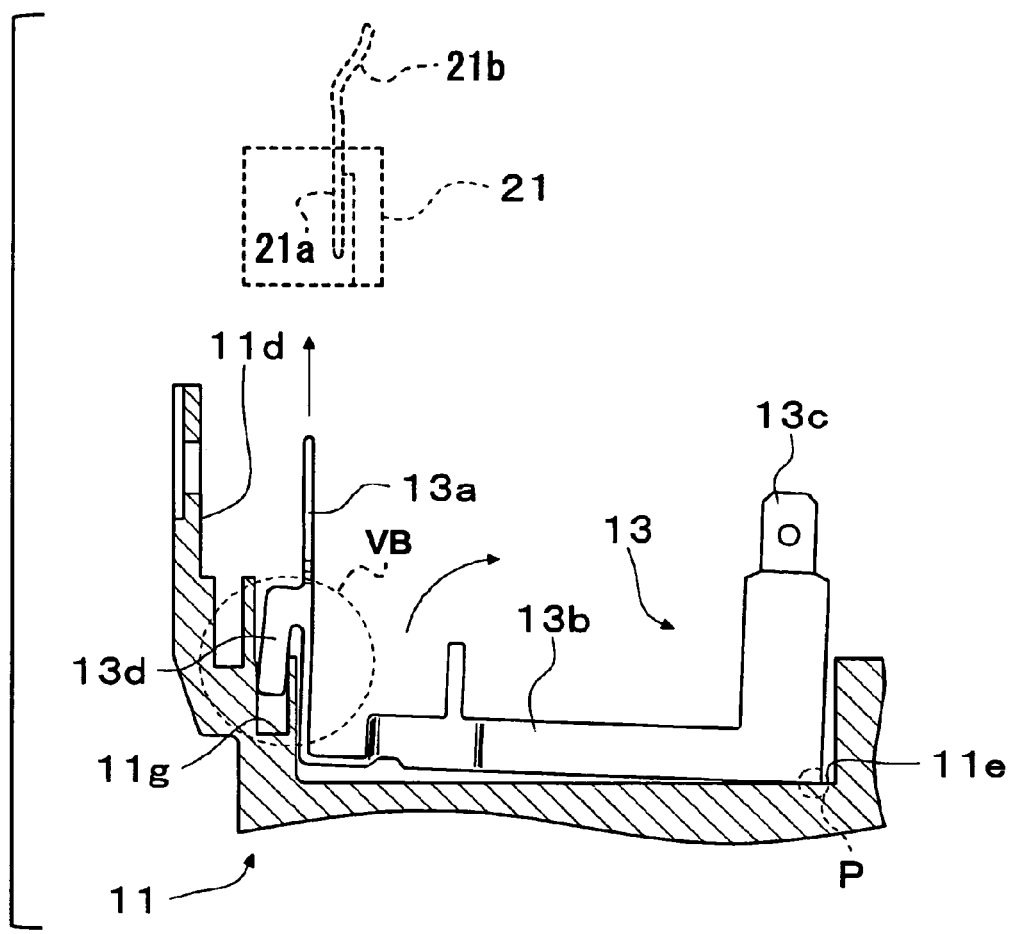
FIG. 5A is a partial cross sectional view showing a tilted state of the terminal at the time of pulling an external connector from the terminal.
Figure 5B:
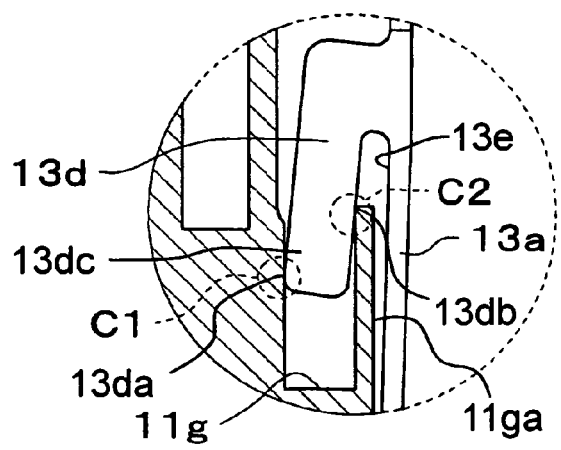
FIG. 5B is an enlarged view of an area VB in FIG. 5A.
Figure 6A:
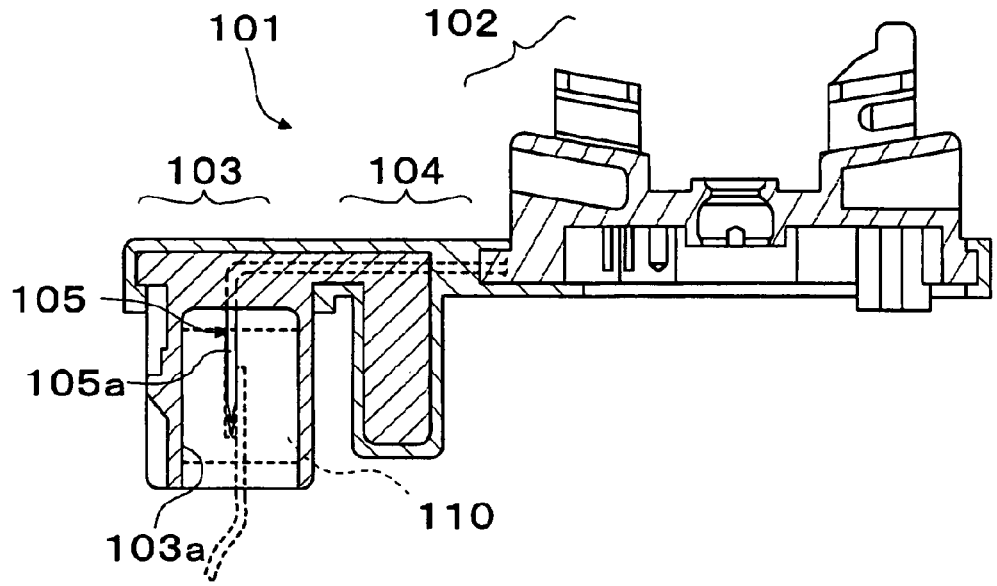
FIG. 6A is a schematic view showing an installation structure of a terminal in a prior art motor.
Figure 6B:
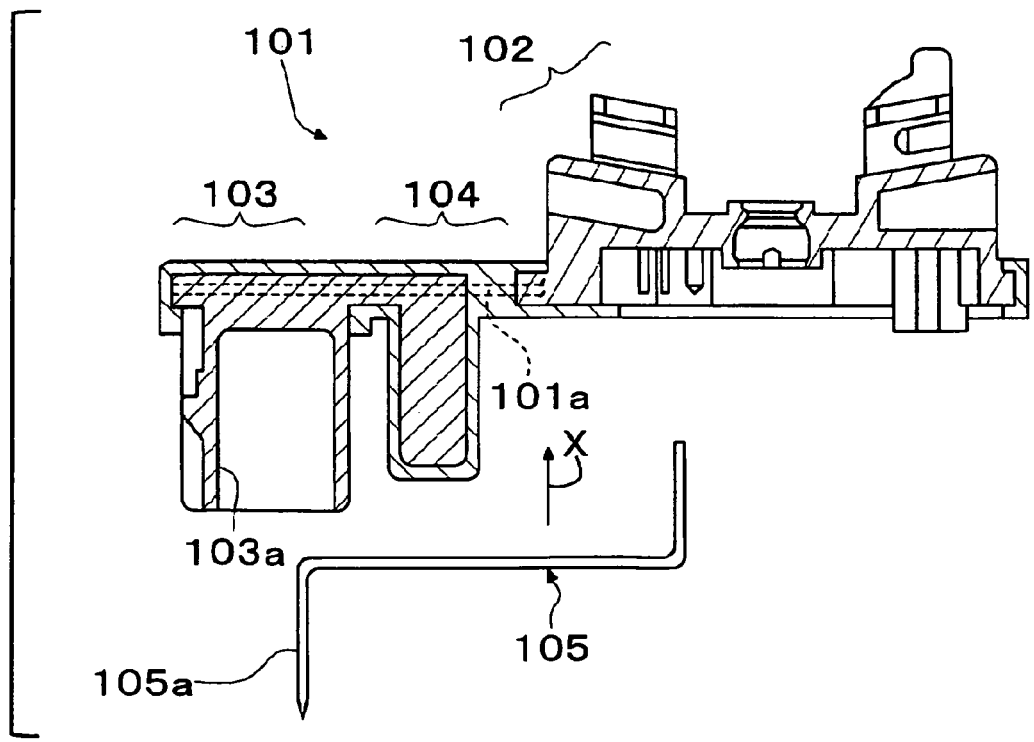
FIG. 6B is a schematic view showing installation of the terminal of FIG. 6A.

FIG. 4 is the partial cross sectional view showing the installed state of the terminal 13, which is installed in the end housing 11. Specifically, FIG. 4 is a cross sectional view showing a longitudinal cross section of the end housing 11 taken along the receiving groove 11e in FIG. 2. More specifically, FIG. 4 is a cross sectional view taken along line IV-IV in FIG. 2. FIG. 5A shows the tilted sate of the terminal 13 at the time of removing the terminal 21a of the external connector 21 from the terminal 13. FIG. 5B is an enlarged view of an area VB in FIG. 5A.

As shown in FIG. 4, the terminal 13 is fixed to the end housing 11 while the extension 13b of the terminal 13 is received in the receiving groove 11e. The terminal connection 13a protrudes in the connection hole 11d, and the projecting end side of the terminal connection 13a is connected with the terminal 21a of the external connector 21. The electrically conductive line 21b extends from the terminal 21a of the external connector 21 and is connected to the external power source (not shown).

As shown in FIG. 5A, when the terminal 21a of the external connector 21 is pulled away from the terminal connection 13a in the direction (the vertical direction of the arrow in FIG. 5A) opposite from the installation direction to remove the terminal 21a of the external connector 21 from the terminal connection 13a, a force acts on the terminal connection 13a in an opposite direction (an upward direction in FIG. 5A), which will be hereinafter referred to as a pulling direction. The extension 13b is received in and is fixed in the receiving groove 11e, so that when the force is applied to the terminal connection 13a in the pulling direction, an end portion of the extension 13b, which is opposite from the terminal connection 13a, contacts an inner wall surface of the receiving groove 11e. Therefore, the entire terminal 13 is tilted about a fulcrum P, which is the part of the extension 13b.

The terminal 13 is formed such that the branch 13d projects on the side of the terminal connection 13a, which is opposite from the extension 13b. As shown in FIG. 5B, the branch 13d is received in the accommodation hole 11g such that an elongated gulf-like recess 13e of the terminal 13, which is defined between the branch 13d and the terminal connection 13a, receives a partition wall (a projecting wall) 11ga of the accommodation hole 11g. With the above construction, when the terminal 13 is tilted, the lateral surface of the branch 13d contacts the wall surface of the end housing 11, which forms the inner surface of the accommodation hole 11g. More specifically, a contact surface 13da of the branch 13d contacts the inner wall surface of the accommodation hole 11g at an outer location C1, which is located on the outer side in the tilting direction, and a contact surface 13db of the branch 13d contacts the inner wall surface of the hole 13g (more specifically, a wall surface of the partition wall 11ga of the accommodation hole 11g) at an inner location C2, which is located on the inner side in the tilting direction. When the branch 13d contacts the wall surface of the accommodation hole 11g, the tilting of the terminal 13 is limited to limit further tilting of the terminal 13. Therefore, it is possible to limit the unintentional removal of the terminal 13 from the end housing 11, which would be otherwise caused by further tilting of the terminal 13. The contact surfaces 13da, 13db of the branch 13d are cut with a stamping die at the time of stamping the terminal 13 from the plate material, so that cutting streaks are created at the contact surfaces 13da, 13db of the branch 13 by the stamping die to extend in a direction generally perpendicular to the plane of FIG. 5B. Therefore, a surface roughness of the contact surfaces 13da, 13db are larger than that of the other part (e.g., a side surface 13dc of the branch 13d that extends in a direction parallel to the plane of FIG. 5B) of the terminal 13, which is not cut by the stamping die. As a result, the contact surfaces 13da, 13db of the branch 13d can bite the wall surface of the accommodation hole 11g more effectively in comparison to the smooth surface. In this way, the tilting of the terminal 13 is more reliably limited.

Although the function of limiting the unintentional removal of the terminal 13 from the receiving groove 11e have been discussed above, the similar function is also implemented with respect to the terminal 14 through use of the branch 14d. Since the function of limiting the unintentional removal of the terminal 14 is similar to that of the terminal 13, detailed description for this function will not be made for the sake of simplicity.

In the above embodiment, the accommodation hole 11g is formed in the end housing 11, and the branch 13d is received in the accommodation hole 11g to limit the unintentional removal of the terminal 13. However, the accommodation hole 11g may be not necessary in some cases. Specifically, as long as the branch 13d can contact the wall surface of the end housing 11 upon tilting of the terminal 13, the end housing 11 may have any other suitable shape.

For example, the end housing 11 may have a wall surface, which is generally parallel to the extending direction of the branch 13d, without providing a corresponding hole in the end housing 11. In such a case, with reference to FIG. 5B, the branch 13d contacts the wall surface of the end housing 11 only at the location C1 without making a contact at the location C2. Even in this way, the tilting of the terminal 13 may be sufficiently limited to limit the unintentional removal of the terminal 13 in some cases.

Additional advantages and modifications will readily occur to those skilled in the art. The invention in its broader terms is therefore not limited to the specific details, representative apparatus, and illustrative examples shown and described.

What is claimed is:

1. An electric motor comprising:
    a motor main body that receives an armature in a rotatable manner;
    a housing that is installed to the motor main body; and
    at least one terminal that is installed in the housing without passing through a wall of the housing and supplies electric power, which is received from an external connector, to the armature, wherein:
    each of the at least one terminal includes:
    a terminal connection that is directly connectable with a corresponding terminal of the external connector;
    an extension that extends from and is bent relative to the terminal connection;
    a brush contact that extends from the extension on a side opposite from the terminal connection and is adapted to be electrically connected with the armature through a corresponding brush after the installation of the terminal in the housing; and
    a branch that projects from the terminal connection on a side opposite from the extension, wherein a projecting end side of the branch extends in an installation direction of the terminal, which is a direction for installing the terminal to the housing; and
    the terminal is tiltable relative to the housing about a portion of the extension, which serves as a fulcrum, to cause abutment of the branch against a wall surface of the housing when the corresponding terminal of the external connector is pulled and separated from the terminal connection, wherein the separation of the corresponding terminal of the external connector applies a force to the terminal connection in a direction opposite to the installation direction.

2. The electric motor according to claim, 1, wherein the branch is configured into a generally L-shape as viewed from a lateral side thereof.

3. The electric motor according to claim 1, wherein the housing includes at least one accommodation recess, which receives the branch of the at least one terminal.

4. The electric motor according to claim 1, wherein a contact surface of the branch, which contacts the wall surface of the housing without being joined to the wall surface of the housing, has a surface roughness larger than that of an adjacent area of the branch that is adjacent to the contact surface of the branch to frictionally hold the branch against the wall surface of the housing when the corresponding terminal of the external connector is pulled and separated from the terminal connection.

5. The electric motor according to claim 1, wherein:
    the terminal connection is generally planar;
    the branch is generally planar; and
    a plane of the branch is generally perpendicular to a plane of the terminal connection.

6. The electric motor according to claim 1, wherein:
an elongated recess is formed between the branch and the terminal connection in the terminal; and
the housing has a projecting wall, which is received in the elongated recess of the terminal and is engageable with the branch upon tilting of the terminal relative to the housing.

7. The electric motor according to claim 1, wherein:
the at least one terminal includes first and second terminals;
the terminal connection of the first terminal and the terminal connection of the second terminal are aligned one after another in an imaginary plane; and
the branch of the first terminal and the branch of the second terminal are located on a side of the imaginary plane, which is opposite from the brush contact of the first terminal and the brush contact of the second terminal.

8. An electric motor comprising:
a motor main body that receives an armature in a rotatable manner;
a housing that is installed to the motor main body; and
at least one terminal that is installed in the housing without passing through a wall of the housing for receiving electric power from an external connector and for supplying the electric power to the armature, wherein:
the terminal includes:
a terminal connection that is adapted to engage and electrically couple with the external connector when the external connector is moved into engagement with the terminal connection in an installation direction of the terminal, which is a direction in which the terminal is moved with respect to the housing when the terminal is installed in the housing;
an extension that includes a first end and a second end, wherein the first end is opposite to the second end, and wherein the first end of the extension extends from and is bent relative to the terminal connection;
a brush contact that extends from the second end of the extension, wherein the brush contact is adapted to be electrically connected with the armature through a brush after installation of the terminal in the housing; and
a branch that projects from the terminal connection on a side of the terminal connection that is opposite to the extension, wherein the branch includes a leg, which is parallel to the terminal connection, and wherein a distal end of the leg projects in the installation direction of the terminal,
the housing defines at least one accommodation recess, which receives the leg of the branch, wherein the accommodation recess is located radially further from an axis of the armature than the extension,
when the external connector is pulled and disengaged from the terminal connection in a direction opposite to the installation direction, the terminal tilts relative to a wall of the accommodation recess about a portion of the extension, which serves as a fulcrum, to cause abutment of the leg against the wall of the accommodation recess as a result of force applied to the terminal connection in the direction opposite to the installation direction when the external connection is pulled and disengaged from the terminal connection, and
the abutment of the branch against the wall of the accommodation recess creates resistance to movement of the terminal when the external connection is pulled and disengaged from the terminal connection to secure the terminal in the housing.

9. The electric motor according to claim 8, wherein a contact surface of the branch, which contacts the wall surface of the housing without being joined to the wall surface of the housing, has a surface roughness larger than that of an adjacent area of the branch that is adjacent to the contact surface of the branch to frictionally hold the branch against the wall surface of the housing when the corresponding terminal of the external connector is pulled and separated from the terminal connection.

10. The electric motor according to claim 8, wherein:
the terminal connection is generally planar;
the branch is generally planar; and
a plane of the branch is generally perpendicular to a plane of the terminal connection.

11. The electric motor according to claim 8, wherein:
an elongated recess is formed between the branch and the terminal connection in the terminal; and
the housing has a projecting wall, which is received in the elongated recess of the terminal and which engages with the branch upon the tilting of the terminal relative to the housing.

12. The electric motor according to claim 8, wherein:
the terminal is one of first and second terminals, which are substantially identical;
the terminal connection of the first terminal and the terminal connection of the second terminal both lie in an imaginary plane; and
the branch of the first terminal and the branch of the second terminal are both located on a side of the imaginary plane that is opposite to a side of the imaginary plane on which the brush contact of the first terminal and the brush contact of the second terminal are located.

13. The electric motor according to claim 1, wherein:
a contact surface of the portion of the extension, which serves as the fulcrum and contacts the housing in the installation direction of the terminal, is located in an imaginary transverse plane that is perpendicular to the installation direction; and
the projecting end of the branch is spaced away from the imaginary transverse plane in a direction opposite to the installation direction.

14. The electric motor according to claim 8, wherein:
a contact surface of the portion of the extension, which serves as the fulcrum and contacts the housing in the installation direction of the terminal, is located in an imaginary transverse plane that is perpendicular to the installation direction; and
the projecting end of the leg is spaced away from the imaginary transverse plane in the direction opposite to the installation direction.

* * * * *